(12) United States Patent
Bowers et al.

(10) Patent No.: US 11,689,470 B2
(45) Date of Patent: Jun. 27, 2023

(54) ALLOCATION OF PROCESSORS FOR PROCESSING PACKETS

(71) Applicant: Intel Corporation, Santa Clara, CA (US)

(72) Inventors: Gregory J. Bowers, Hillsboro, OR (US); Kevin C. Scott, Forest Grove, OR (US); Manasi Deval, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 181 days.

(21) Appl. No.: 16/398,618

(22) Filed: Apr. 30, 2019

(65) Prior Publication Data

US 2019/0260686 A1 Aug. 22, 2019

Related U.S. Application Data

(60) Provisional application No. 62/780,865, filed on Dec. 17, 2018.

(51) Int. Cl.
| | |
|---|---|
| *H04L 12/863* | (2013.01) |
| *H04L 12/833* | (2013.01) |
| *H04L 12/851* | (2013.01) |
| *H04L 12/801* | (2013.01) |
| *H04L 47/625* | (2022.01) |
| *H04L 47/31* | (2022.01) |
| *H04L 47/193* | (2022.01) |
| *H04L 47/2441* | (2022.01) |
| *H04L 47/2483* | (2022.01) |

(52) U.S. Cl.
CPC ........ *H04L 47/6255* (2013.01); *H04L 47/193* (2013.01); *H04L 47/2441* (2013.01); *H04L 47/2483* (2013.01); *H04L 47/31* (2013.01)

(58) Field of Classification Search
CPC ............... H04L 47/193; H04L 47/2441; H04L 47/2483; H04L 47/31; H04L 47/6255; H04L 47/20; H04L 47/24
See application file for complete search history.

(56) References Cited

U.S. PATENT DOCUMENTS

| 2004/0066746 A1* | 4/2004 | Matsunaga ......... H04L 47/2483 370/235 |
| 2006/0067349 A1 | 3/2006 | Ronciak et al. |
| 2013/0188494 A1 | 7/2013 | Mekkattuparamban et al. |

(Continued)

OTHER PUBLICATIONS

Extended European Search Report for Patent Application No. 19203449.4, dated May 12, 2020, 8 pages.

(Continued)

*Primary Examiner* — Derrick V Rose
(74) *Attorney, Agent, or Firm* — Compass IP Law PC

(57) ABSTRACT

Examples described herein identify a flow that is considered heavy or high in transmit or receive rate. A filter rule can be assigned to the flow such that packets of the heavy flow are allocated to a queue and core for processing. Various queues and cores can be dedicated to processing received or transmitted packets of heavy flows and various queues and cores can be dedicated to process received or transmitted packets of non-heavy flows. An application acceleration layer can be used to migrate an application to a core that is to process received or transmitted packets of a heavy flow.

26 Claims, 10 Drawing Sheets

(56) References Cited

U.S. PATENT DOCUMENTS

| | | | |
|---|---|---|---|
| 2015/0055457 A1* | 2/2015 | Agarwal | H04L 49/9047 370/230 |
| 2015/0089495 A1* | 3/2015 | Persson | G06F 9/45558 718/1 |
| 2015/0163145 A1* | 6/2015 | Pettit | H04L 43/026 370/237 |
| 2018/0114012 A1* | 4/2018 | Sood | G06F 21/53 |
| 2018/0159771 A1* | 6/2018 | Malloy | H04L 45/745 |
| 2018/0241677 A1* | 8/2018 | Srebro | H04L 47/6255 |
| 2018/0331961 A1 | 11/2018 | Lambeth et al. | |
| 2019/0190838 A1* | 6/2019 | Shpiner | H04L 47/56 |
| 2019/0253362 A1* | 8/2019 | Ruthstein | H04L 43/026 |

OTHER PUBLICATIONS

Microsoft Docs, "Introduction to Receive Side Scaling—Windows drivers", Apr. 19, 2017, downloaded from the Internet Oct. 11, 2019, https://docs.microsoft.com/en-us/windows-hardware/drivers/network/int . . . 4 pages.

Microsoft Docs, "Receive Segment Coalescing (RSC)", Aug. 30, 2016, downloaded from the Internet Apr. 29, 2019, https://docs.microsoft.com/en-us/previous-versions/windows/it-pro/win . . . 3 pages.

Bhuvana Ramachandran, "Servers—A key block in Data Center infrastructure business", Anything Connected, Exploring connected technologies, trends, businesses and ecosystems, Sep. 14, 2014, 5 pages. Retrieved from internet: https://connectedtechnbiz.wordpress.com/tag/elephant-flows/s.

Jake Edge, "Receive flow steering", LWN.net, Apr. 7, 2010, 4 pages. Retrieved from internet: https://lwn.net/Articles/382428/.

Suse Support, "Improving network performance using Receive Packet Steering (RPS)", Document ID No. 7015585, Aug. 26, 2014, 5 pages. Retrieved from internet: https://www.suse.com/support/kb/doc/?id=000018430.

European First Office Action for Patent Application No. 19203449.4, dated Dec. 15, 2021, 9 pages (EP Exam Report Article 94(3) EPC).

\* cited by examiner

ALLOCATION OF PROCESSORS FOR PROCESSING PACKETS

RELATED APPLICATION

The present application claims the benefit of priority date of U.S. provisional patent application Ser. No. 62/780,865, filed Dec. 17, 2018, the entire disclosure of which is incorporated herein by reference.

TECHNICAL FIELD

Various examples described herein relate to allocation of processors for packet processing.

BACKGROUND

In a network interface device, Transmission Control Protocol (TCP) packets are received for many different connections. TCP connections can include TCP packets provided in a TCP session between two devices where multiple TCP packets are transmitted with the same IP addresses (e.g., destination and source) and ports (e.g., destination and source). Some TCP connections are long lived and generate a copious amounts of traffic. Some TCP connections are short lived and generate sparse amounts of traffic. If a single central processing unit (CPU) is allocated to process traffic, the single CPU can quickly become overburdened when faced with large amounts of traffic, leading to degraded network performance. To alleviate this, network interface devices attempt to spread the processing of network traffic to multiple CPUs.

DETAILED DESCRIPTION

Figure 1:
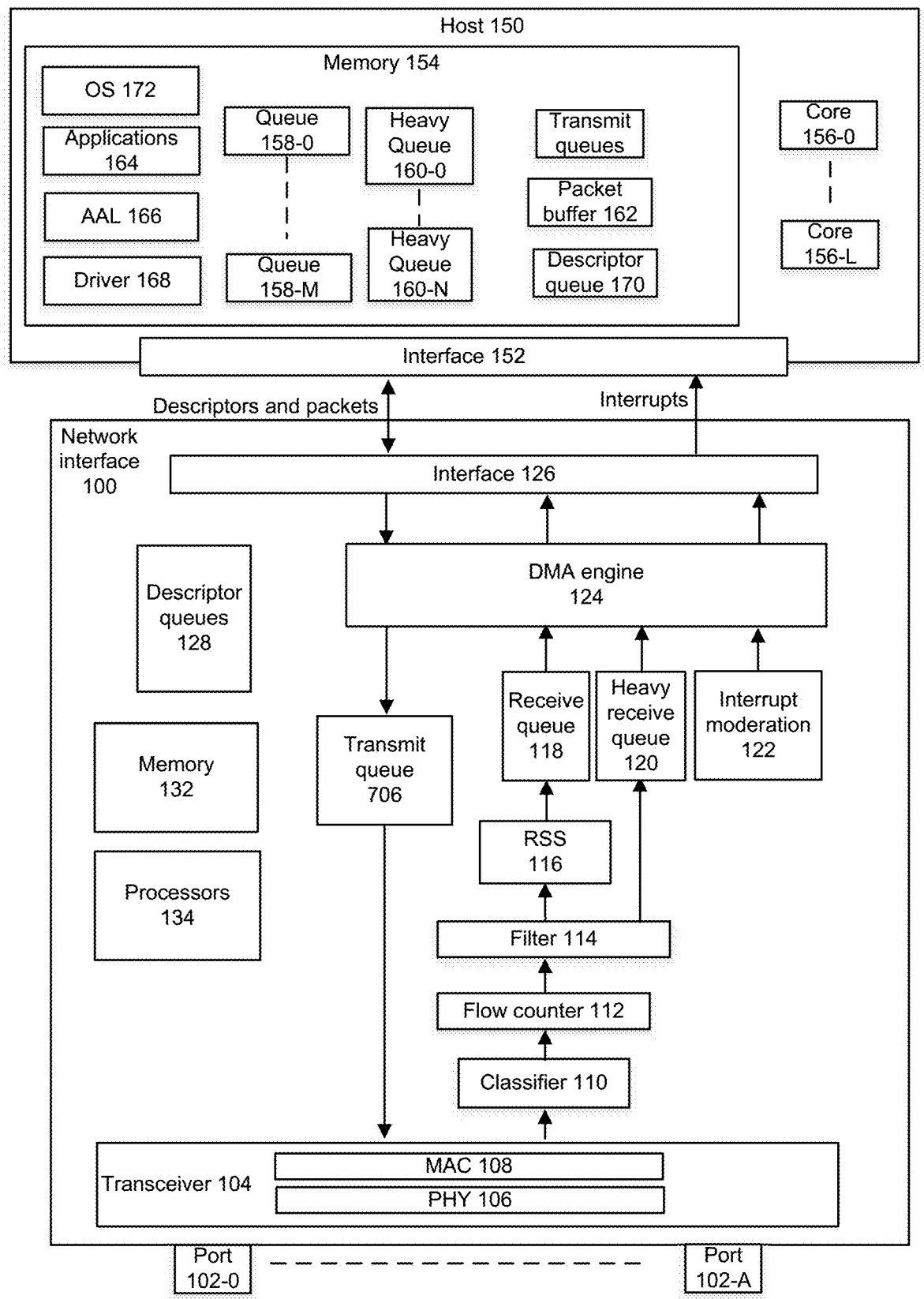
FIG. 1 depicts an example system including a network interface and a host system.

One known technique for distributing network traffic to different CPUs is to apply a filter to distribute traffic to different CPUs. However, setting a specific filter per connection is a processing intensive task. Another known approach for distributing network traffic among CPUs is to use Receive Side Scaling (RSS). RSS provides a manner of distributing flows among a set of CPUs. RSS distributes network traffic to CPUs in a statistical way by use of a hashing calculation across multiple connections and by use of an indirection table. The number of hash buckets can correspond to a number of CPUs and corresponding queues in use. The hash-based distribution works well for many traffic flows. However, in some cases, if the set of flows has some long lived high traffic flows, the CPU that ends up processing the flow experiences an uptick in packet processing and congestion may result.

Some known solutions involve changing an indirection table for flows to CPUs. Changing the indirection table can statistically change the distribution of flows with the hope that it may alleviate congestion at one or more CPUs. For example, hashes may be generated for varying a secret key or number of CPUs such that a unique CPU is provided for the elephant flow. An elephant flow can be a large continuous flow (in total bytes) set up by a TCP flow (or other protocol) over a network link. However, CPU utilization for processing received packets may be uneven across flows.

Various embodiments provide a manner of identifying heavy flows (e.g., elephant flows) at a network interface device and allocating heavy flows to queues and associated cores for processing. Various embodiments can be applied for packet receive or transmit directions. A single filter rule can be applied to route a received packet in a non-heavy flow for processing by receive side scaling or a received packet in a heavy flow to a heavy flow queue. Accordingly, numerous filter rules do not need to be applied for routing any flow that is heavy or non-heavy. Non-heavy flows can be allocated to queues and associated cores using any flow distribution techniques such as but not limited to RSS. An application acceleration layer can provide for provisioning an application for execution on the same core that also performs network packet processing for the application. For example, if a heavy flow is allocated for processing by a core, the application acceleration layer can schedule execution of an application thread on the same core that perform network packet processing for flows consumed by the application thread. A flow that is identified as heavy can have its designation changed to non-heavy and vice versa. By changing an identification of a flow from heavy to non-heavy or vice versa, various embodiments provide for allocating both heavy and non-heavy queues for the flow to provide for hand off of packet processing from a first core to a second core while maintaining order of packet processing.

A heavy flow (e.g., elephant flow) interleaved with non-heavy flows puts pressure on technologies such as Adaptive Interrupt Moderation (AIM) and Receive Side Coalescing (RSC). By separating out the placement of heavy flows onto specific queues for heavy flow traffic in accordance with various embodiments, performance on the flows spread can improve. AIM and/or RSC can be used for heavy flows and used separately for non-heavy flows. The queue supporting the heavy flow may be further tuned to the characteristics of the flow, potentially achieving better overall performance. Tuning can include configuration of features such as Interrupt Moderation, number descriptors in the descriptor ring, number of RSC contexts assigned, polling versus interrupt mode. In addition, various embodiments can potentially avoid congestion or delays arising from when a flow changes from non-heavy to heavy by distributing the workload of the heavy flow to a core dedicated to processing heavy flows.

FIG. 1 depicts an example system including a network interface and a host system. Network interface 100 provides for identifying heavy flows and routing those heavy flows to designated heavy flow queues. A heavy flow can be identified as a flow with packets having a byte count per time (bytes/second) that exceeds a threshold rate. The threshold rate can be set by a user or administrator of a network interface. A heavy flow queue can be associated with one or more of: a CPU, core, execution unit, application specific integrated circuit (ASIC), or other packet processing hardware. Network interface 100 can classify packets into a flow that are subject to a non-heavy allocation (e.g., RSS distribution) or elephant flow allocation. In some embodiments, network interface 100 is a device that can connect a host system to a network, a fabric, interconnect, bus, or other communication media (wired or wireless). In some embodiments, network interface 100 can be an interface to a communications fabric, storage network (e.g., non-volatile memory express (NVMe) or NVMe over Fabrics (NVMeOF), interconnect, the Internet, or a private network.

Network interface 100 includes one or more ports 102-0 to 102-A. A port can represent a physical port or virtual port. A packet received at a port 102-0 to 102-A is provided to transceiver 104. Transceiver 104 provides for physical layer processing 106 and MAC layer processing 108 of received packets in accordance with relevant standards. For example, processing can be in accordance with standards such as IEEE 802.3-2018, or other standards. Classifier 110 can determine a classification of a received packet. The received packet can encapsulate a packet such as a TCP packet, User Datagram Protocol (UDP) packet, Stream Control Transmission Protocol (SCTP) packet, and so forth. For example, classifier 110 can determine a flow associated with a TCP packet from one or more of: a destination port, a destination IP address, a destination port, or a destination IP address. Classifier 110 can determine flow characteristics from other aspects of a received packet such as a connection identifier (e.g., connection ID from Quick UDP Internet Connections (QUIC) protocol), an HTTP header, or other characteristics of a packet header or payload.

Flow counter 112 can determine a count of received bytes per second for a flow of TCP packets (or other types of packets) or other types of connections or flows (e.g., full duplex or non-full duplex). For example, flow counter 112 can determine a receive rate in bytes/second for one or more flows or connections. Based on a single filter rule, filter 114 can route a received packet (or a portion or derivation of a packet or packets) for processing using non-heavy flow allocation (e.g., receive side scaling (RSS) 116) or to heavy flow queue 120. Accordingly, in some examples, a filter rule for each flow is not needed as flows can be allocated using heavy or non-heavy designations.

In some examples, driver 168 executed by host 150 programs filter 114 to route packets in heavy flows to a heavy receive queue 120. For example, driver 168 programs filter 114 to route packets from a flow that has a rate of bytes/second of packets that exceeds a threshold to a heavy receive queue 120. In some examples, driver 168 can detect a count of received bytes in the flow associated with the packet over a period of time (e.g., bytes of entire packet/second). If driver 168 detects the bytes/second of packets in a flow exceeds a threshold, the flow can be considered heavy and driver 168 instructs filter 114 to route packets in the heavy flow to a heavy receive queue 120. In some examples, a processor at network interface 100 can monitor bytes/second of packets in a flow and program filter 114 to transfer received packets in the heavy flow to heavy traffic receive queue 120. In some examples, a control plane software (e.g., Open vSwitch (OVS), vector packet processing (VPP), and Tungsten Fabric vRouter) can be used to monitor whether received bytes in the flow associated with the packet over a period of time exceeds a threshold and are to be routed to a heavy receive queue 120.

Filter 114 can route packets in a heavy flow to heavy receive queue 120. Heavy receive queue 120 can store packets prior to transfer to a heavy queue among heavy queues 160-0 to 160-N. Filter 114 can select a heavy queue among heavy queues 160-0 to 160-N by one or more of: evicting a least active heavy flow from a queue and selecting that queue, evicting a smaller heavy flow from a queue and selecting that queue, round robin, random, one time hash per flow, or another scheme is to be used to determine a queue to receive the packet (or a portion or derivation thereof).

For packets not classified as part of a heavy flow, RSS 116 can calculate a hash value on a portion of a received packet and use an indirection table to determine a receive queue (among queue 158-0 to 158-M) and associated core in host 150 to process a received packet. RSS 116 stores the received packets into receive queue 118 for transfer to host 150. Packets with the same calculated hash value are provided to the same queue among queues 158-0 to 158-M. In some examples, RSS 116 does not distribute packets to any of heavy queues 160-0 to 160-N. One of heavy queues 160-0 to 160-N receive a packet if filter 114 determines that packet is part of a flow that is considered heavy. A queue can be a region of memory (volatile or non-volatile) in the network interface or host system allocated to store a packet and/or descriptors related to the packet. A descriptor can be a data structure provided by host 150 to network interface 100 to identify available regions of memory or cache to receive packets. Network interface 100 can complete a descriptor to refer to content of one or more packets stored in a receive buffer and provide the completed descriptor to host 150 to process related packet(s).

Direct memory access (DMA) or copy engine 124 can copy or transfer contents of a packet and a corresponding descriptor from descriptor queues 128 of network interface 100 to one or more of packet buffer 162, a selected queue (queue 158-0 to 158-M or heavy queue 160-0 to 160-N), and descriptor queue 170 in host 150. For example, a portion of the packet can be copied via DMA to packet buffer 162 with a reference to a location in packet buffer 162 of the packet stored in a descriptor in a selected queue. Direct memory access (DMA) is a technique that allows an input/output (I/O) device to bypass a central processing unit (CPU) or core, and to send or receive data directly to or from a system memory. Because DMA allows the CPU or core to not manage a copy operation when sending or receiving data to or from the system memory, the CPU or core can be available to perform other operations. Without DMA, when the CPU or core is using programmed input/output, the CPU or core is typically occupied for the entire duration of a read or write operation and is unavailable to perform other work. With DMA, the CPU or core can, for example, initiate a data transfer, and then perform other operations while the data transfer is in progress. The CPU or core can receive an interrupt from a DMA controller when the data transfer is finished. DMA engine 124 can perform DMA coalescing whereby the DMA engine 124 collects packets before it initiates a DMA operation to a queue in host 150.

Interrupt moderation 122 can determine when to perform an interrupt to inform host system 150 that a packet or packets or references to any portion of a packet or packets is available for processing from a queue. For example, an expiration of a timer or reaching or exceeding a size threshold of packets can cause an interrupt to be generated. An interrupt can be directed to a particular core among cores 156-0 to 156-L that is to process a packet or group of packets. For example, if a heavy flow is directed to a heavy queue 160-0 and heavy queue 160-0 is associated with core 156-0, then an interrupt can be provided to core 156-0 to process one or more received packets.

Interrupt moderation 122 can handle interrupts for heavy flows separately from interrupts of non-heavy flows such that packets of a heavy or non-heavy type are grouped separately as heavy or non-heavy and interrupts are provided for a particular queue 158-0 to 158-M for non-heavy type flows or for heavy queues 160-0 to 160-N for heavy type flows. Driver 168 can program operation of interrupt moderation 122 in terms of how to group interrupts and when to make an interrupt.

Receive Segment Coalescing (RSC) can also be utilized. RSC is queueing or buffering content from received packets into a packet or content combination and allowing the queued or buffered content to be copied to another location. An example of RSC is used with Microsoft's Windows Server 2012. DMA engine 124 can copy a packet combination (or a single packet) to a queue (e.g., any of queue 150-0 to 158-M or heavy queue 160-0 and heavy queue 160-0). Packets in non-heavy flows can be separately coalesced and copied from packets in heavy flows.

Referring to host system 150, device driver 168 can be a processor executed driver that serves as a device driver for network interface 100. Device driver 168 can create descriptors and manage the use and allocation of descriptors for a receive queue. Device driver 168 can process interrupts from network interface 100 that inform host system 150 of availability of a copy of a received packet in packet buffer 162 or memory 154 on host 102. Device driver 168 can determine the location of the received packet in packet buffer 162 based on a return descriptor that describes such received packet and device driver 168 can inform operating system 172 of the availability and location of the received packet.

Application acceleration layer (AAL) 166 can be implemented as processor-executed software in host system 150. Device driver 168 can inform AAL 166 of an assignment of a packet flow to a particular queue (e.g., queue 158-0 to 158-M or heavy queue 160-0 to 160-N). AAL 166 can communicate with applications 164 and operating system (OS) 172 to identify a queue assigned to a particular flow. In some cases, a queue can be associated with a particular core. An application can execute a thread on the same core that is assigned to process received packets in a queue. For example, if a core 156-0 is to process packets associated with heavy queue 160-0, an application thread that is to process content of a received packet associated with heavy queue 160-0 can execute on core 156-0. However, the same core that executes an application need not also perform packet processing of packets associated with an application. A different core can execute an application from a core that performs packet processing of packets associated with the application.

In some embodiments, one or more processor cores 156-0 to 156-L can process instructions which, when executed, perform operations for system and or user software. In some embodiments, at least one of the one or more processor cores 156-0 to 156-L is configured to process a specific instruction set. In some embodiments, instruction set may facilitate Complex Instruction Set Computing (CISC), Reduced Instruction Set Computing (RISC), or computing via a Very Long Instruction Word (VLIW). One or more processor cores 107 may each process a different instruction set, which may include instructions to facilitate the emulation of other instruction sets. A processor core may also include other processing devices, such as a Digital Signal Processor (DSP).

In some embodiments, one or more processor cores 156-0 to 156-L includes cache memory. Depending on the architecture, one or more processor cores 156-0 to 156-L can have a single internal cache or multiple levels of internal cache. In some embodiments, the cache memory is shared among various components of one or more processor cores 156-0 to 156-L. In some embodiments, one or more processor cores 156-0 to 156-L also uses an external cache (e.g., a Level-3 (L3) cache or Last Level Cache (LLC)) (not shown), which may be shared among one or more processor cores 156-0 to 156-L using known cache coherency techniques.

In some embodiments, a flow can be converted from a heavy flow to a non-heavy flow while received packets in the flow are being provided to an assigned queue. For example, if a received byte rate of a heavy flow lowers for a threshold period of time below the threshold rate (e.g., X bytes/second), then the flow can be considered non-heavy. For example, if a byte rate of a flow exceeds a threshold rate (e.g., Y bytes/second) for a threshold period of time, then a non-heavy flow can be considered to be heavy. In the case where a status of flow changes (e.g., from heavy to non-heavy or vice versa), network interface 100 provides for a flow of packets to be processed by driver 168 on the former queue before any packets from the flow are processed by driver 168 on the next queue. Processing packets in segment order can occur if packets assigned to the former queue are all processed prior to processing any packets in the flow assigned the next queue. Additional examples of a manner of transitioning from heavy to non-heavy flow or vice versa are provided herein.

Figure 2A:
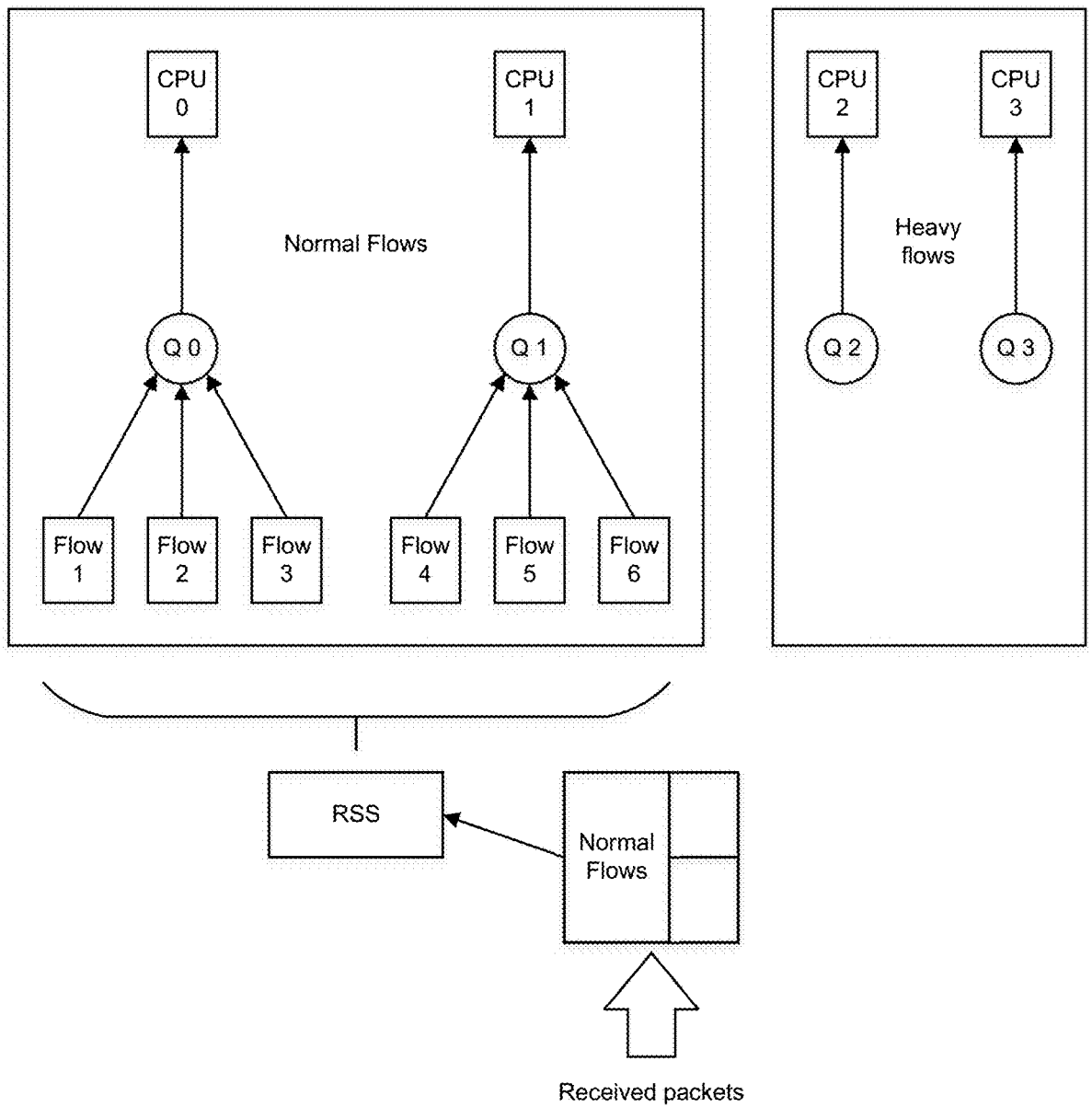
FIG. 2A depicts an example where flows which are allocated to different queues.

FIG. 2A depicts an example where flows are allocated to different queues and processed on separate CPUs. Queues Q0 and Q1 and CPU0 and CPU1 can be allocated to non-heavy flows. For example, queue Q0 can be allocated to receive packets (or portions thereof) from flows 1-3. Queue Q1 can be allocated to receive packets (or portions thereof) from flows 4-6. Queues Q2 and Q3 can be allocated to receive packets designated as heavy flows. CPU2 and CPU3 can be assigned to process packets associated with respective queues Q2 and Q3. In this example, the driver has available heavy queues Q2 and Q3 associated with respective CPU2 and CPU3 but flows have not been allocated to Q2 or Q3, and CPU2 and CPU3 are not currently in use. In some examples, CPU2 or CPU3 can be allocated to process non-heavy (e.g., normal) flows but when a heavy flow is identified or received, CPU2 or CPU3 is allocated for processing at least one heavy flow and zero or more non-heavy flows. Non-heavy flows (Flows 1-6) are provided to queues Q0 to Q1 for processing by CPU0 and CPU1.

Figure 2B:
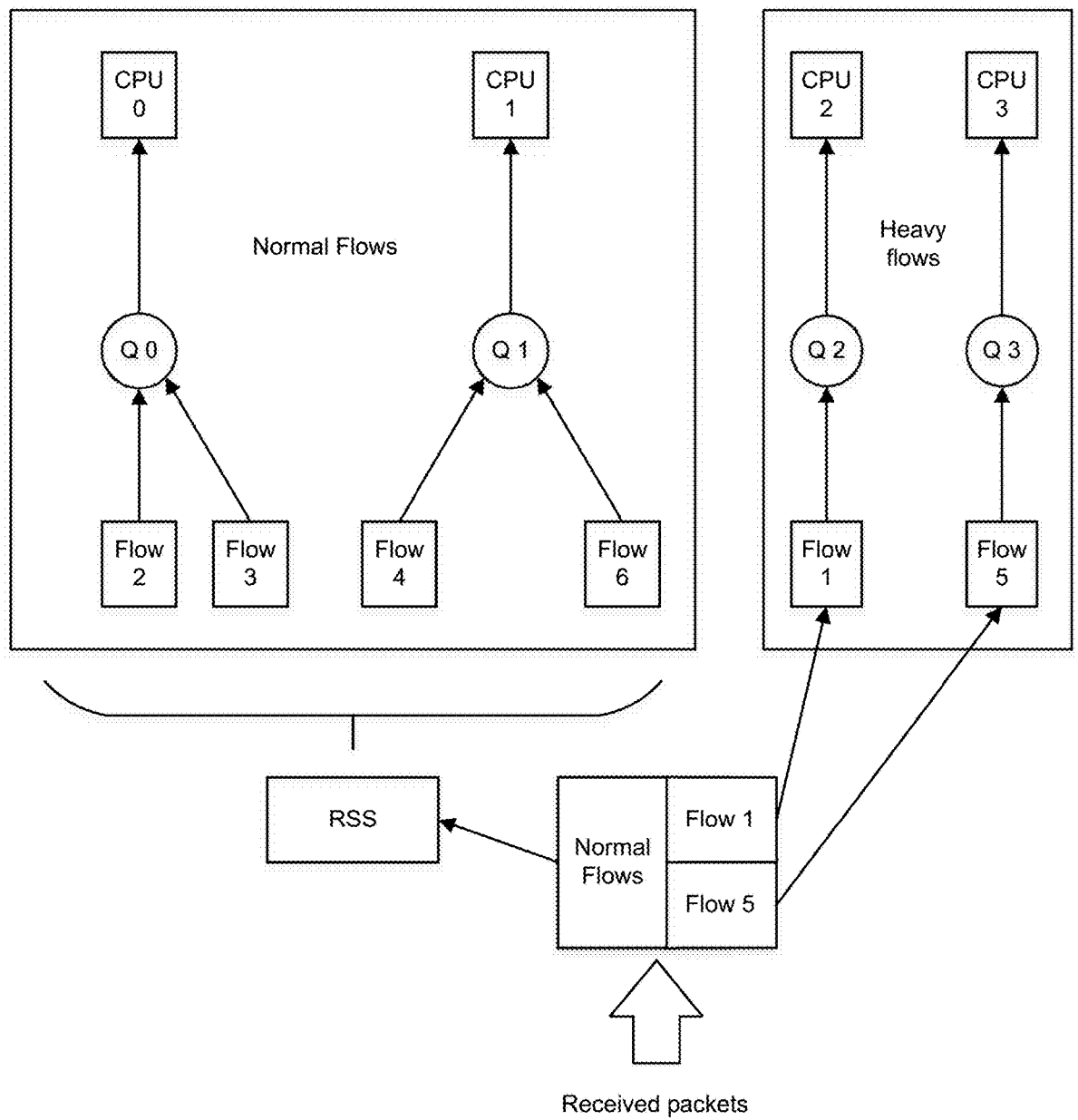
FIG. 2B depicts an example where a heavy flow is identified and directed.

FIG. 2B depicts an example where flows are identified as heavy flows. In this example, flow 1 and flow 5 are re-classified from normal non-heavy flows to heavy flows. A network interface filter directs the heavy flows 1 and 5 to respective queues Q2 and Q3. Queues Q2 and Q3 are associated with respective CPU2 and CPU3. Queues Q2 and Q3 and CPU2 and CPU3 could be dedicated for heavy (e.g., elephant flows). Features such as Receive Segment Coalescing (RSC) and Interrupt Moderation can be applied to transfer packets of heavy flows to queues Q2 and Q3 host memory. In some cases, in addition to handling a heavy flow or when a heavy flow is not being processed by any of CPU2 and CPU3, any of CPU2 and CPU3 could also be allocated to handle other lighter RSS flows, non-latency sensitive processing, background processing such as Low Extra Delay Background Transport (LEDBAT) and so forth.

Figure 2C:
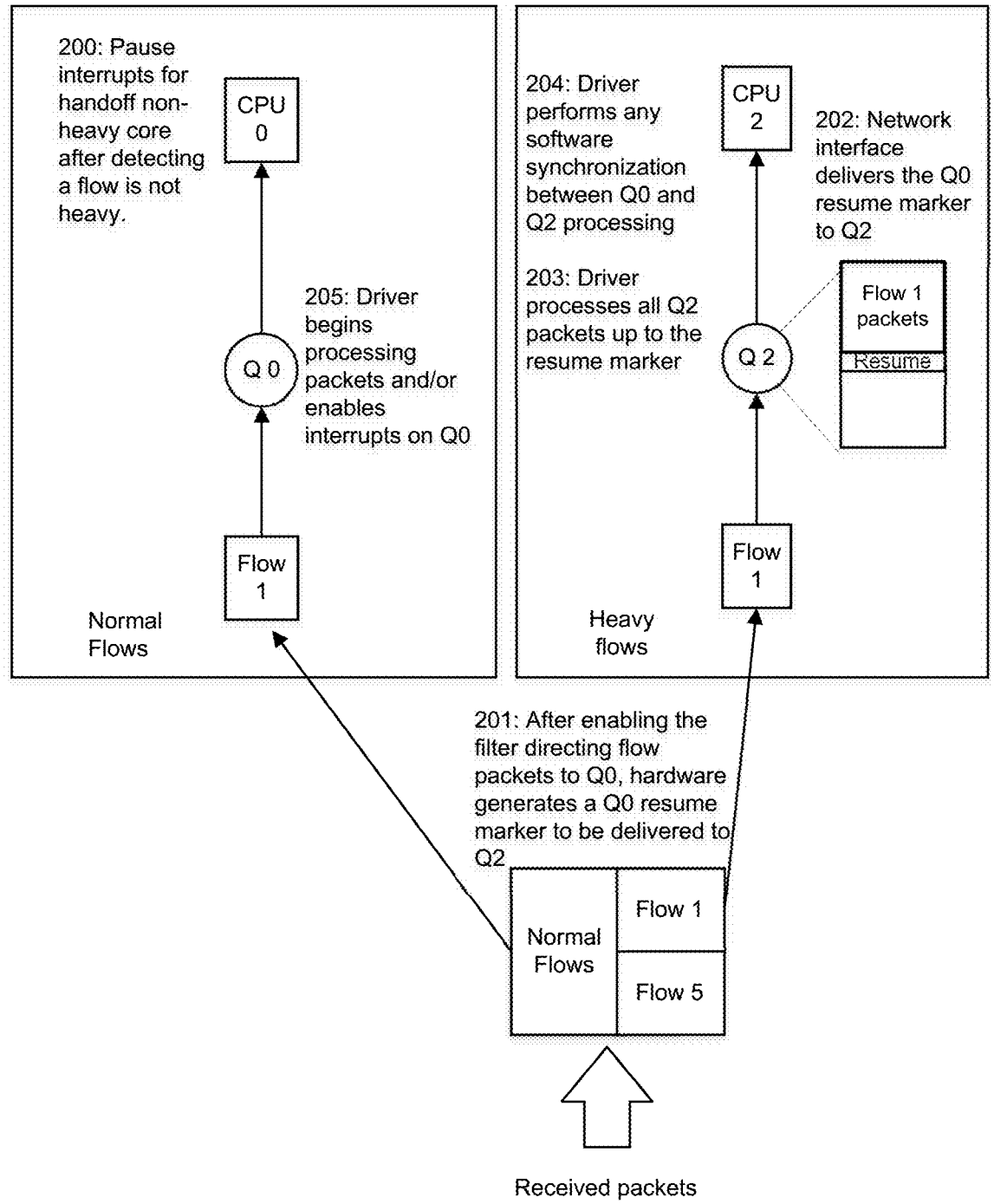
FIG. 2C depicts an example of changing of a flow from heavy flow to a non-heavy flow.

FIG. 2C depicts an example of a flow changing from a heavy flow to a non-heavy flow. In this example, a queue for a heavy flow is Q2 and a queue that would be used for the same flow (flow 1) after it becomes non-heavy (normal) is Q0. At action 200, after detecting a change in flow status from heavy to non-heavy, network interface pauses providing interrupts for processing packets in queue Q0 on the host. At action 201, the driver can program network interface filter (e.g., filter 114) that flow 1 is not heavy and to direct packets in the flow 1 from a heavy queue (Q2) to a non-heavy queue (Q0). At and after action 201, new descriptors for packets of flow 1 are provided to queue Q0. At action 202, the network interface sends a Q0 resume marker to queue Q2. At action 203, the driver processes packets in Q2 received prior to the resume marker. At action 203, the driver detects the resume marker via a descriptor or other approach (e.g., marker counter), which indicates that processing of all descriptors in queue Q2 preceding those on queue Q0 have been processed. At 204, the driver performs any packet processing synchronization between software threads or processes, as appropriate for the driver, operating system and application design, to indicate a new queue (Q0) for packets in flow 1 and potentially causes a migration of an application thread that consumes packets in flow 1 to CPU0. At 205, the driver begins processing packets on queue Q0 and may direct network interface to resume generating interrupts for packet processing on queue Q0. A similar procedure can be applied for changing packets from processing on a non-heavy queue to a heavy queue.

Figure 3:
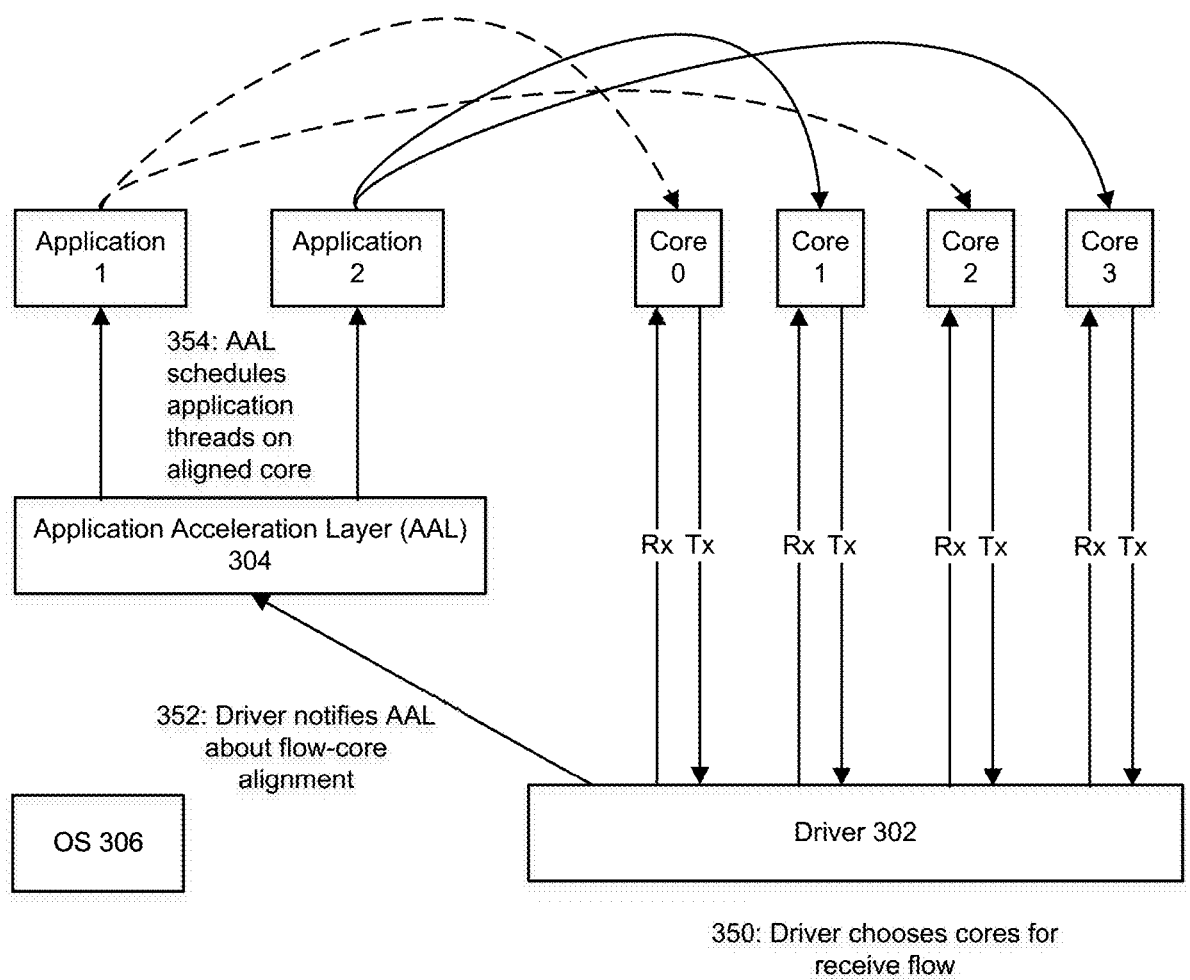
FIG. 3 depicts an example system.

FIG. 3 depicts an example operation of a system. At 350, a network interface driver 302 identifies heavy flows (e.g., based on flow byte counter over time measured at a port) and selects an appropriate core to process the traffic in the heavy flow. A network interface driver 302 monitors the per-flow counters, identifies heavy flows, updates the flow filter table to add and/or remove filters to steer heavy flows to allocated queues. Additionally or alternatively, driver 302 can also modify an allocated receive queue of a flow if a status of the flow changes from heavy to non-heavy. At 352, driver 302 informs Application Acceleration Layer (AAL) 304 of changes to flow-to-core mappings. In some embodiments, to keep all processing of a flow on a single core, an application that consumes the data from the flow is provisioned on the same core as that used to process packets. At 354, AAL 304 processes the flow-to-core mapping information and directs an application thread to execute on a core that also processes packets of a flow having data to be consumed by the application. In other words, the application runs its data processing thread on the core used to process its received packet flow. An application can also initiate a transmission using its allocated core that processes received packets.

In some embodiments, operating system (OS) 306 can drive the migration of an elephant flow from processing by a core to processing by another core. In some embodiments, the network interface (e.g., a smart NIC) detects the flow status and drives the migration of an elephant flow to processing by a core and reporting to the driver when initiating the migration. Driver 302 reports per flow counters to OS 306 and provides an interface that OS 306 can use to program the flow tables to steer the flows to different queues and cores. AAL 304 could be responsible for helping migrate application threads to the new core that processes the packets.

For a transmission of heavy flows, the driver can use the technologies described earlier to identify a heavy flow in the transmit direction whereby a transmitted flow can be identified as heavy based on its data transmit rate over a period of time exceeding a threshold. After the transmitted flow is identified as heavy, the driver could create a filter to direct the receive traffic of this flow to an appropriate core associated with the core used to transmit the heavy flow and use the technologies described herein to inform the AAL that the flow has moved so that the application can be moved to the core that processes the received packets.

For a transmission of heavy flows, the AAL, OS or other software can provide a hint to the driver in order to select a transmit queue on an appropriate core. This hint may take the form of an opaque value such as a cookie or hash value, which will then be used by the driver to select the proper transmit queue. The application or other software may know a priori that a flow is a heavy flow and can directly inform the driver to align flows for a specific core with this hint. Flows consist of transmit and receive queue pairs, so if a heavy flow is moved to core A, there is a corresponding transmit queue associated with that core A for the flow to use and the corresponding transmit queue can be used to transmit a flow, whether heavy or not.

Figure 4:
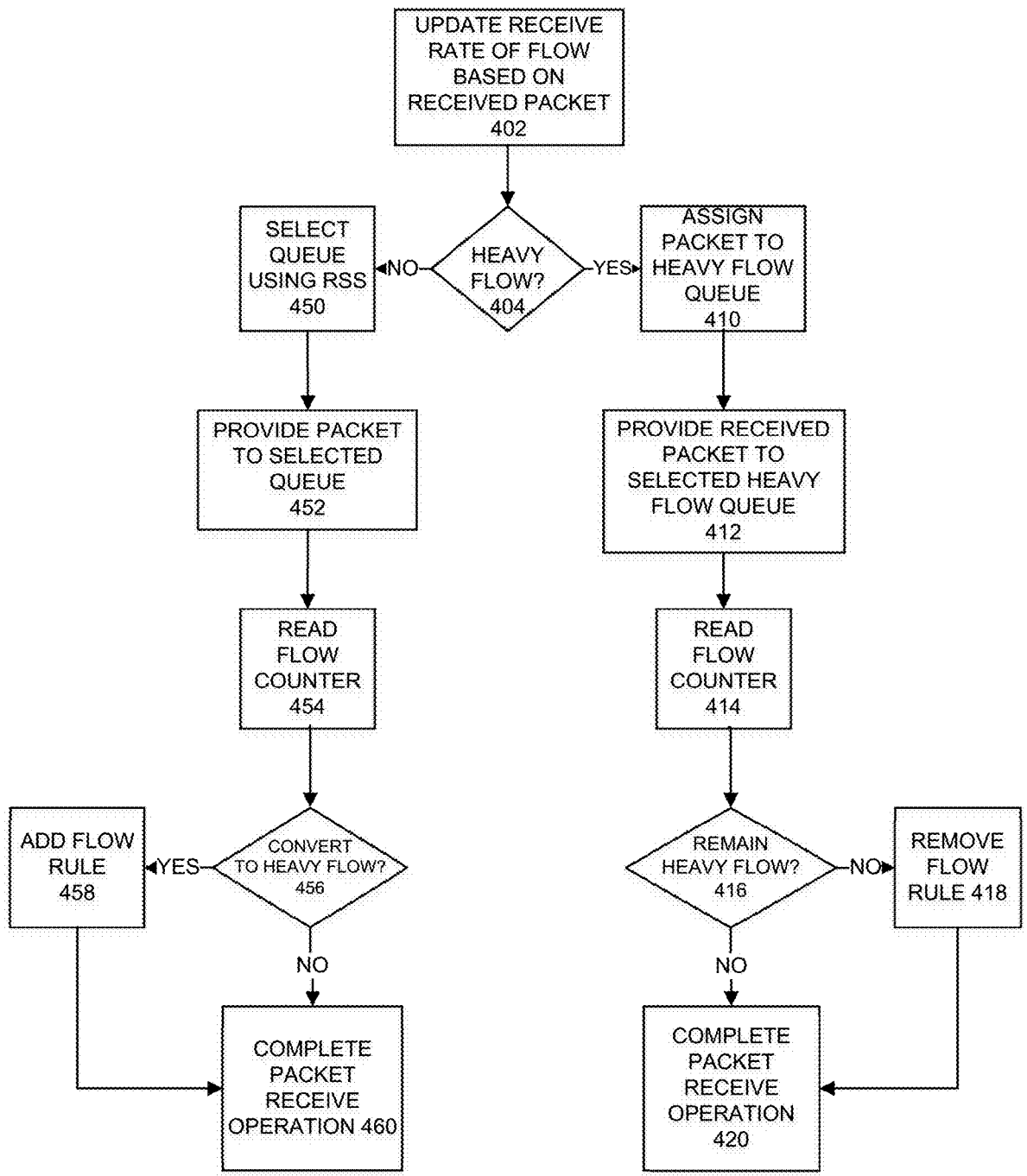
FIG. 4 depicts a flow chart of a decision making process.

FIG. 4 depicts a process. The process of FIG. 4 can be performed by a network interface driver or other software or hardware. At 402, a rate of received packets for a flow can be updated to account for a received packet. For example, a packet can be received at a port of a network interface and a count of a size of an entire packet (e.g., bytes) can be measured and accumulated with a running count for a flow. A flow classification can be performed to determine a flow associated with the received packet. The flow of the received packet can be determined based on header or payload properties of the received packet (or both). For example, the flow can be determined based on one or more of: destination port, destination IP address, destination port, or destination IP address.

At 404, a determination is made as to whether a flow for the received packet is a heavy flow. For example, if a rate of bytes of received packets per second in the flow over an interval of time meets or exceeds a threshold, then the flow can be considered a heavy flow. For example, if a flow is identified as heavy using a flow rule, received packets in the flow are allocated using a heavy flow rule. If the current flow is considered a heavy flow or the flow already has an allocated flow rule that identifies the flow as heavy, then 410 follows. If the current flow is not considered heavy, then 450 follows. In other examples, multiple heaviness levels of a flow can be determined such as non-heavy, medium, or heavy. Multiple levels of a flow can determined using multiple threshold levels.

At 410, the packet is assigned to a heavy flow queue in accordance with a previously configured rule (e.g., a prior execution of action 458). At 412, the received packet is provided to the selected heavy queue. For example, a descriptor related to the selected heavy queue can be completed with properties of the received packet including an indication of a location in system memory or cache the received packet is stored. A direct memory access operation can be used to copy the received packet (or portion thereof) (or a group of portions of packets) to the heavy queue provisioned in system memory or cache. In addition, segment coalescing can be applied to combine content of multiple packets for transfer to a destination receive queue.

At 414, a flow counter is read for the current flow. For example, a determination of a packet receive rate can be made to determine a rate of bytes of received packets per second. At 416, a determination is made as to whether the flow should remain a heavy flow based on the determined received packet bytes over a measure of time (e.g., bytes/ second). If the flow is determined to not be a heavy flow, then 418 follows where the flow rule to route the flow to the selected heavy queue is removed. In addition or alternatively, the flow is identified as a non-heavy flow and received packets in the flow can be allocated using non-heavy flow allocation. If the flow is still determined to be a heavy flow, then 420 follows. Action 420 follows 416 or 418. At 420, the packet receipt is completed by the received packet being processed by a core associated with the selected heavy queue.

Referring to 450, in which a flow of a received packet was determined to be a non-heavy flow, a flow rule is applied for the non-heavy flow whereby a queue is selected for the received packet using receive side scaling (RSS). RSS can use a hash calculation on a portion of the received packet and an indirection table to select a queue. For non-heavy flows, other queue or core allocation schemes can be used. At 452, the received packet is provided to the selected receive queue. For example, a descriptor related to the selected heavy queue can be completed with properties of the received packet including an indication of a location in system memory or cache the received packet is stored. A direct memory access operation can be used to copy the received packet (or portion thereof) (or a group of portions of packets) to the non-heavy queue provisioned in system memory or cache. At 454, a flow counter is read for the current flow. The flow counter can indicate a packet receive rate of the flow. For example, the packet receive rate can be based on the determined received packet bytes over a measure of time (e.g., bytes/second). At 456, a determination is made as to whether the flow should become a heavy flow based on the determined received packet bytes over an interval of time (e.g., bytes/second over an interval of time). The flow can be identified as a heavy flow based on whether the packet receive rate of the flow over the interval of time meets or exceeds a threshold. If the flow is determined to be a heavy flow, then 458 follows where a flow rule is added to identify the flow as a heavy flow and subsequent received packets in the heavy flow can be directed to a heavy queue. A heavy flow queue can be selected based on one or more of: evicting a least active heavy flow from a queue and selecting that queue, evicting a smaller heavy flow from a queue and selecting that queue, round robin, random, one time hash per flow, or another scheme is to be used to determine a queue to receive the packet (or a portion or derivation thereof). Action 460 follows 456 or 458. At 460, the packet receipt is completed by the received packet being processed by a core associated with the selected queue.

Figure 5:
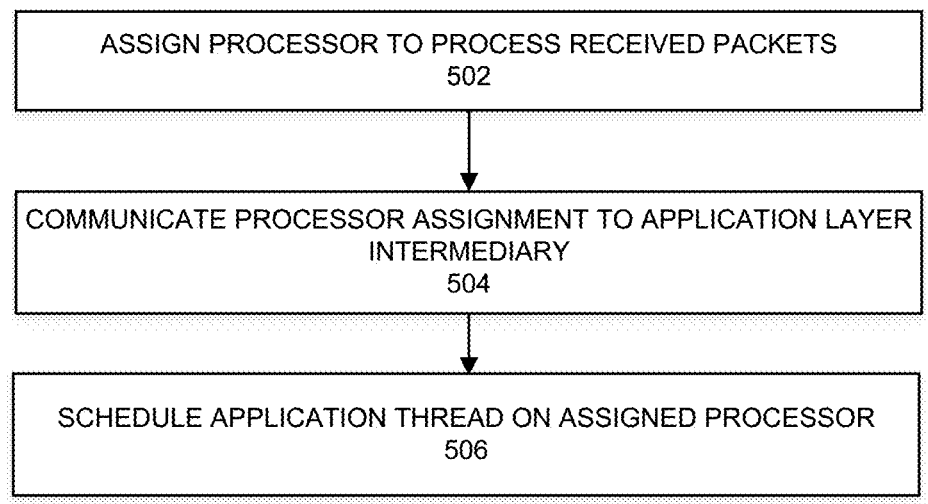
FIG. 5 depicts an example process.

FIG. 5 depicts an example process. The process of FIG. 5 can be performed in a host system to inform an application of a processor core that is assigned to process received packets for the application. At 502, a processor core can be assigned to process received packets for a flow. For example, a driver may determine which queue and its associated processor core is to process received packets for a flow. The queue can be determined using RSS or selected from a heavy queue. In some examples, instead of selecting a processor core to process received packets of a flow, a queue is selected. The queue can be associated with one or more processor cores whereby the processor core(s) process packets received at the queue. If a flow is considered non-heavy, the queue can be selected using any arbitration or selection scheme. If a flow is considered heavy, the queue can be selected from among a set of one or more heavy queues.

At 504, the driver can communicate the processor core assignment for a flow to an application layer intermediary. The application layer intermediary can be an application acceleration layer. The application acceleration layer can communicate to an application that received packets associated with a flow having data to be accessed or used by the application is to be processed by a particular processor core. In some examples, the driver can itself communicate with the application information of the processor core that is processing packets in a flow that are to be accessed by the application. At 506, the application can schedule a thread on the processor core assigned to process received packets for the application. A thread can be a sequence of instructions that are scheduled for execution by a processor. Processing of received packets can include one or more of: determination if a packet is valid (e.g., correct Ethernet type, correct checksum, correct IP Protocol type, valid layers 4-7 protocol type), determination of packet destination (e.g., next hop, destination queue), use of Data Plane Development Kit (DPDK) or OpenDataPlane to perform one or more of: IP filter checks, flow table lookup, outgoing port selection using a forwarding table, packet decryption, packet encryption, denial of server protection, packet counting, billing, traffic management/conditioning, traffic shaping/traffic scheduling, packet marking/remarking, packet inspection of layers 4-7, or traffic load balancing/load distribution.

In some cases, the processor core can also be used to execute a thread to transmit packets for the application. A processor core that processes received heavy traffic can also be used to initiate transmission of a flow, whether heavy or not. A transmitted flow can be detected as heavy based on packet transmission rate over a period of time meeting or exceeding a threshold and the transmitted flow can be allocated to a processor core used for heavy transmit flows. The corresponding received flow can be processed by the same core used for initiating heavy transmit flows.

Figure 6:
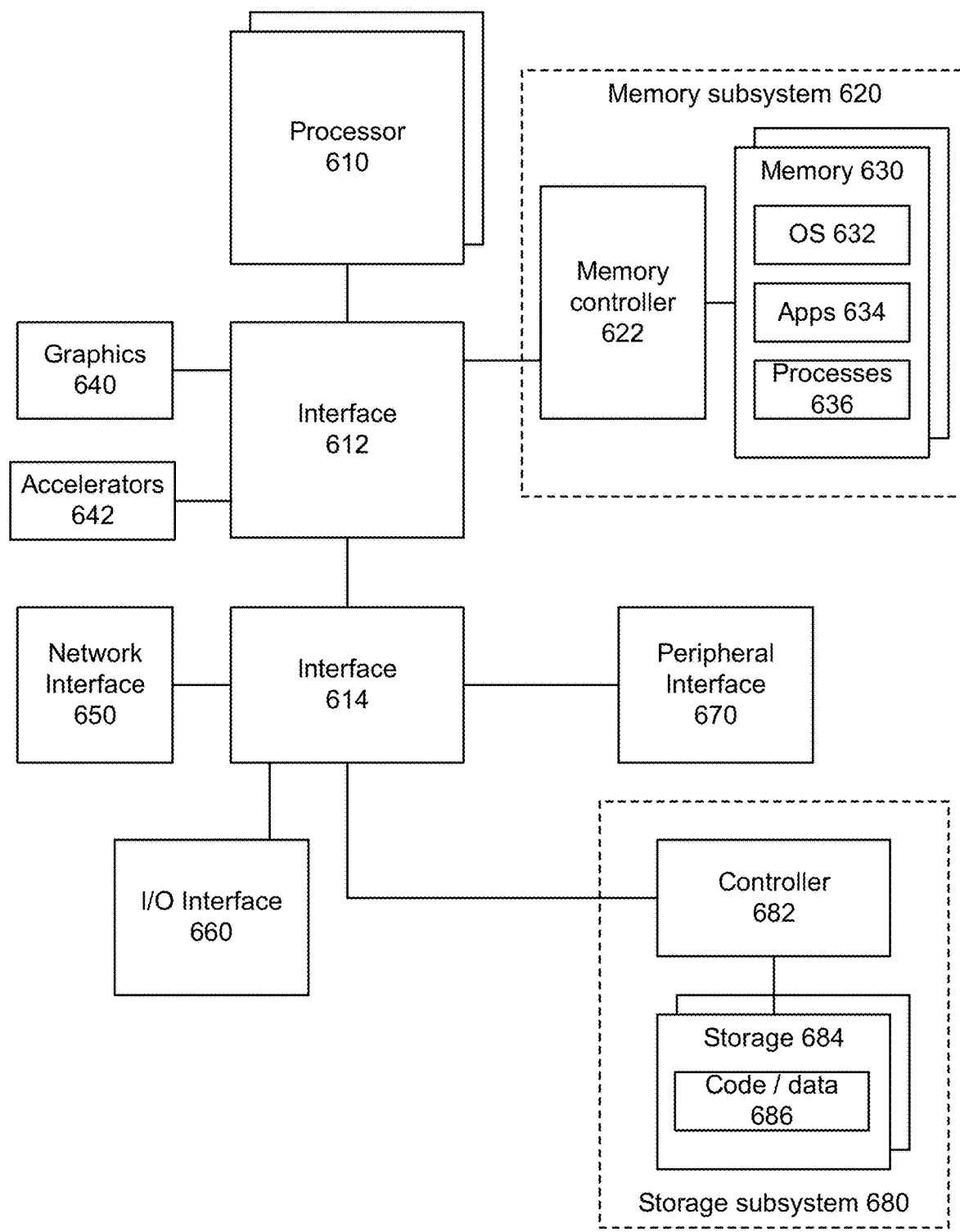
FIG. 6 depicts a system.

FIG. 6 depicts a system. The system can use embodiments described herein to allocate heavy or non-heavy flows of packets to a core for processing. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a fixed function offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs).

Accelerators 642 can provide multiple neural networks, processor cores, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a remote device, which can include sending data stored in memory. Network interface 650 can receive data from a remote device, which can include storing received data into memory. Various embodiments can be used in connection with network interface 650, processor 610, and memory subsystem 620.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (i.e., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (i.e., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 7:
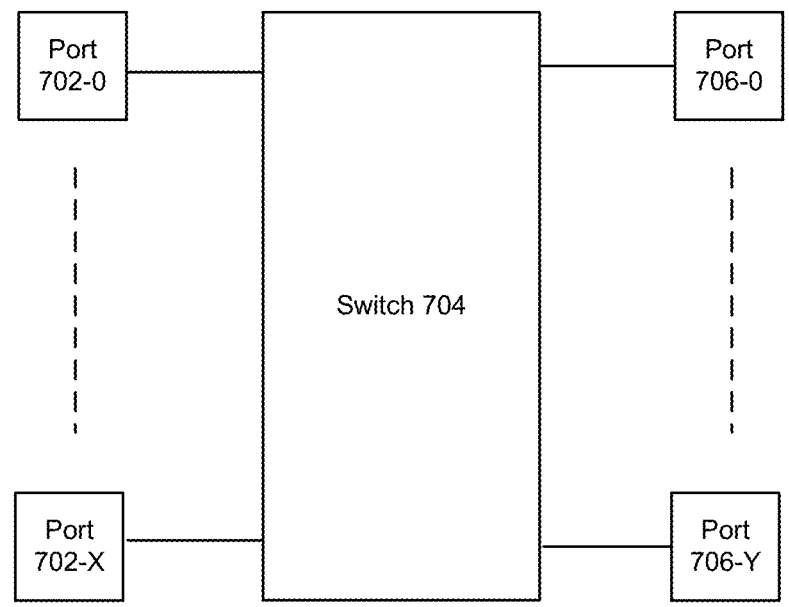
FIG. 7 depicts an example switch.

FIG. 7 depicts an example switch. Various embodiments can be used in or with the switch of FIG. 7 to provide management of non-heavy and heavy flows. Switch 704 can route packets or frames of any format or in accordance with any specification from any port 702-0 to 702-X to any of ports 706-0 to 706-Y (or vice versa). Any of ports 702-0 to 702-X can be connected to a network of one or more interconnected devices. Similarly, any of ports 706-0 to 706-X can be connected to a network of one or more interconnected devices. Switch 704 can decide which port to transfer packets or frames to using a table that maps packet characteristics with an associated output port. In addition, switch 704 can perform packet replication for forwarding of a packet or frame to multiple ports and queuing of packets or frames prior to transfer to an output port.

Figure 8:
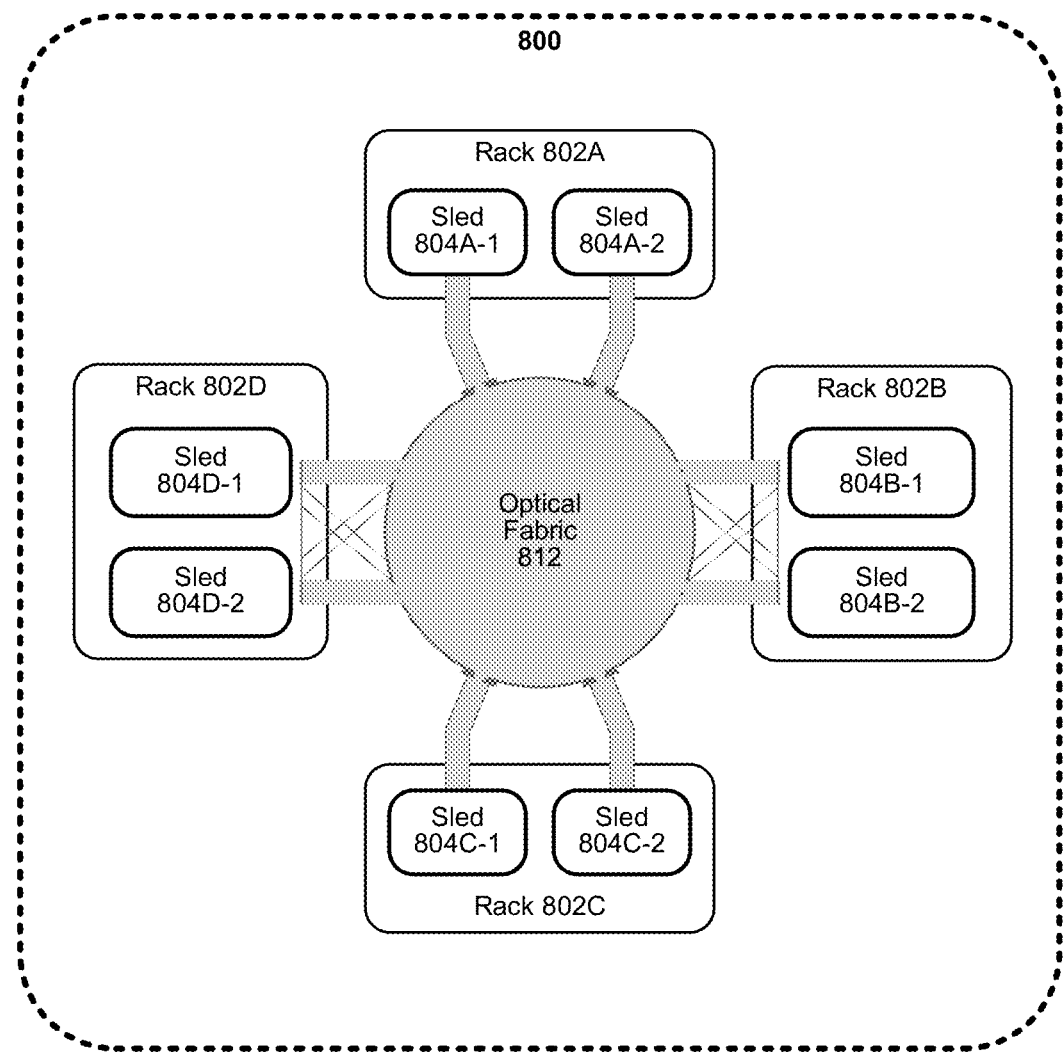
FIG. 8 depicts an example of a data center.

FIG. 8 depicts an example of a data center. Various embodiments can be used in or with the data center of FIG. 8 to allocate heavy flows to queues. For example, the data center can use a network interface can use embodiments to provide management of heavy flows. As shown in FIG. 8, data center 800 may include an optical fabric 812. Optical fabric 812 may generally include a combination of optical signaling media (such as optical cabling) and optical switching infrastructure via which any particular sled in data center 800 can send signals to (and receive signals from) the other sleds in data center 800. The signaling connectivity that optical fabric 812 provides to any given sled may include connectivity both to other sleds in a same rack and sleds in other racks. Data center 800 includes four racks 802A to 802D and racks 802A to 802D house respective pairs of sleds 804A-1 and 804A-2, 804B-1 and 804B-2, 804C-1 and 804C-2, and 804D-1 and 804D-2. Thus, in this example, data center 800 includes a total of eight sleds. Optical fabric 812 can provide sled signaling connectivity with one or more of the seven other sleds. For example, via optical fabric 812, sled 804A-1 in rack 802A may possess signaling connectivity with sled 804A-2 in rack 802A, as well as the six other sleds 804B-1, 804B-2, 804C-1, 804C-2, 804D-1, and 804D-2 that are distributed among the other racks 802B, 802C, and 802D of data center 800. The embodiments are not limited to this example. For example, fabric 812 can provide optical and/or electrical signaling.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes a network interface comprising: at least one port; a filter to assign a packet from a flow for allocation using a non-heavy flow allocation or a heavy flow allocation based at least, in part, on a receive rate of packets in the flow, wherein the filter is to apply a rule to allocate the packet from the flow, wherein the rule is to indicate whether the flow is assigned to a non-heavy flow or a heavy flow; a non-heavy flow allocator to assign the packet; a heavy flow allocator to assign the packet; and a direct memory access (DMA) engine to transfer the packet to an assigned queue based on the non-heavy flow allocation or the heavy flow allocation.

Example 2 includes the network interface of any example and comprises logic to detect change of a flow from a non-heavy status to heavy status and based on the change of a flow from a non-heavy to heavy status: provide a marker in the assigned queue, assign a second queue, and permit processing from the second queue after the marker is detected.

Example 3 includes the network interface of any example and comprises logic to detect change of a flow from a heavy status to non-heavy status and based on the change of a flow from a non-heavy to heavy status: provide a marker in the assigned queue, assign a second queue, and permit processing from the second queue after the marker is detected.

Example 4 includes the network interface of any example and comprises application acceleration logic to allocate an application thread that is to access data from the flow for execution on a same core that is to process the flow.

Example 5 includes the network interface of any example and comprises logic to determine if the receive rate of the packets in the flow meets or exceeds a threshold over an interval of time, wherein the logic is to program the filter to apply a rule to allocate the flow as a non-heavy flow based on the receive rate of the packets in the flow not meeting and not exceeding the threshold over an interval of time or program the filter to apply a rule to allocate the flow as a heavy flow based on the receive rate of the packets in the flow meeting or exceeding the threshold over an interval of time.

Example 6 includes the network interface of any example and comprises logic to determine if a heavy flow is to be re-assigned as a non-heavy flow based on the receive rate of the packets in a flow not meeting and not exceeding a threshold over an interval of time and wherein the logic is to change the rule for the heavy flow to indicate the heavy flow is non-heavy.

Example 7 includes the network interface of any example and comprises logic to determine if a non-heavy flow is to be re-assigned as a heavy flow based on the receive rate of the packets in the non-heavy flow meeting or exceeding a threshold for an interval of time and wherein the logic is to change the rule for the non-heavy flow to indicate the non-heavy flow is heavy.

Example 8 includes the network interface of any example, wherein the non-heavy flow allocator is to apply receive side scaling (RSS) to select a queue for the packet in the flow.

Example 9 includes the network interface of any example, wherein the heavy flow allocator is to select a queue dedicated for allocation of packets from heavy flows.

Example 10 includes the network interface of any example, wherein to select a queue dedicated for allocation of packets from heavy flows, the allocator for a heavy flow is to select a queue by one or more of: selection an unallocated queue, eviction of a least active heavy flow from a queue, evicting a smaller heavy flow from a queue and selecting that queue, round robin, random, or hash calculation.

Example 11 includes the network interface of any example and comprising a first set of queues is associated with a first group of processor cores and the first set of queues are allocated for use by one or more non-heavy flows and comprising a second set of queues is associated with a second group processor cores and the second set of queues are allocated for use by one or more heavy flows, wherein the first set and second set are different.

Example 12 includes the network interface of any example, wherein the flow comprises a Transmission Control Protocol (TCP) connection.

Example 13 includes the network interface of any example and comprises one or more of a host device, server, rack, or data center.

Example 14 includes a method for allocating packets in a flow for processing, the method comprising: determining a flow associated with a received packet; applying a flow allocation rule associated with the flow, wherein the flow allocation rule comprises allocation as a non-heavy flow or allocation as a heavy flow; if the flow is to be allocated as a non-heavy flow, selecting a queue from a group of queues allocated to non-heavy flows; if the flow is to be allocated as a heavy flow, selecting a queue from a group of queues allocated to heavy flows; and copying the received packet to the selected queue.

Example 15 includes a method of any example and comprises detecting change of a flow from a non-heavy status to heavy status and based on the change of the flow from a non-heavy to heavy status: providing a marker in the selected queue, assigning a second queue, and permitting processing from the second queue after the marker is detected.

Example 16 includes a method of any example and comprises detecting change of a flow from a heavy status to non-heavy status and based on the change of the flow from a heavy to non-heavy status: providing a marker in the selected queue, assigning a second queue, and permitting processing from the second queue after the marker is detected.

Example 17 includes a method of any example and comprises determining if a receive rate of packets in the flow meets or exceeds a threshold; setting a flow allocation rule to allocate the flow as a non-heavy flow based on the receive rate of the packets in the flow not meeting and not exceeding the threshold over a time interval; or setting a flow allocation rule to allocate the flow as a heavy flow based on the receive rate of the packets in the flow meeting or exceeding the threshold over a time interval.

Example 18 includes a method of any example and comprises changing the flow allocation rule to identify the flow as heavy based on a receive rate of the packets in the flow meeting or exceeding a threshold over a time interval.

Example 19 includes a method of any example and comprises changing the flow allocation rule to identify the flow as non-heavy based on a receive rate of the packets in the flow not meeting and not exceeding a threshold over a time interval.

Example 20 includes a method of any example, wherein the selecting a queue from a group of queues allocated to non-heavy flows comprises applying receive side scaling (RSS) to select a queue for the packet in the flow.

Example 21 includes a method of any example and comprises allocating an application thread that is to access data from packets of the flow for execution on a same core that is to process packets of the flow.

Example 22 includes a method of any example and comprises a Transmission Control Protocol (TCP) connection.

Example 23 includes a system comprising: a computing platform comprising one or more processors and one or more memory devices and a network interface communicatively coupled to the computing platform, the network interface comprising: a classifier to determine a flow associated with a received packet; a filter configured to apply a rule based on whether the flow of the received packet is considered heavy or not heavy; an allocator to assign the received packet to a queue associated with a heavy flow if the flow is considered heavy or assign the received packet to a queue associated with a non-heavy flow if the flow is considered not heavy; and a direct memory access (DMA) engine to transfer the packet to the assigned queue.

Example 24 includes the system of any example and comprises an application acceleration logic to allocate an application thread that is to access data from packets of the flow for execution on a same core that is to process packets of the of the flow.

Example 25 includes the system of any example, wherein the assign the received packet to a queue associated with a heavy flow comprises one or more of: selection an unallocated queue, eviction of a least active heavy flow from a queue, evicting a smaller heavy flow from a queue and selecting that queue, round robin, random, or hash calculation.

What is claimed is:

1. A network interface comprising:
   circuitry to assign a packet of a flow, received from a network, to a heavy flow based at least, in part, on a receive rate of packets of the flow from the network and based on a rule to identify a flow as a heavy flow;
   circuitry to, based on the packet not being identified as part of the heavy flow, assign the packet to one or more queues by receive side scaling (RSS);
   circuitry to, based on the packet being identified as part of the heavy flow, assign the packet to a second set of one or more queues, wherein the second set of one or more queues are associated with one or more processor cores and the second set of one or more queues are excluded from allocation using the RSS; and
   a direct memory access (DMA) engine to copy the packet to memory allocated to the assigned one or more queues.

2. The network interface of claim 1, comprising circuitry to detect change of a flow from a non-heavy status to heavy status and based on the change of a flow from a non-heavy to heavy status: provide a marker in the assigned one or more queues, assign a second queue, and permit processing from the second queue after the marker is detected.

3. The network interface of claim 1, comprising circuitry to detect change of a flow from a heavy status to non-heavy status and based on the change of a flow from a non-heavy to heavy status: provide a marker in the assigned one or more queues, assign a second queue, and permit processing from the second queue after the marker is detected.

4. The network interface of claim 1, comprising application acceleration logic to allocate an application thread that is to access data from the flow for execution on a same core that is to perform packet processing on the flow.

5. The network interface of claim 1, comprising circuitry to determine if a heavy flow is to be re-assigned as a non-heavy flow based on the receive rate of the packets in a flow not meeting and not exceeding a threshold over an interval of time and based on the determination that the heavy flow is to be re-assigned as a non-heavy flow, identify the flow as non-heavy.

6. The network interface of claim 1, comprising circuitry to determine if a non-heavy flow is to be re-assigned as a heavy flow based on a receive rate of packets in the non-heavy flow meeting or exceeding a threshold for an interval of time and based on the determination that the non-heavy flow is to be re-assigned as a heavy flow, identify the non-heavy flow as a heavy flow.

7. The network interface of claim 1, wherein the flow comprises a Transmission Control Protocol (TCP) connection.

8. The network interface of claim 1, comprising one or more of a host device, server, rack, or data center, wherein the one or more of a host device, server, rack, or data center comprises the one or more processor cores to process packets received in the one or more queues and comprises the second set of one or more processor cores to process packets received in the second set of one or more queues.

9. A method for allocating packets in a flow for processing, the method comprising:
  determining a flow associated with a received packet, wherein the received packet is received from a network;
  applying a flow allocation rule associated with the flow, wherein the flow allocation rule comprises allocation as a heavy flow;
  if the flow is to be allocated as a non-heavy flow, selecting a queue from a group of queues allocated to non-heavy flows by a hash-based calculation;
  if the flow is to be allocated as a heavy flow, selecting a queue from a group of queues allocated to store one or more packets of one or more heavy flows, wherein the group of queues allocated to store one or more packets of one or more heavy flows is not part of the group of queues allocated to non-heavy flows by the hash-based calculation and wherein at least one of the queues in the group of queues allocated to non-heavy flows by the hash-based calculation is associated with a core and at least one of the queue in the group of queues allocated to store one or more packets of one or more heavy flows is associated with a second core; and
  copying the received packet to memory allocated to the selected queue.

10. The method of claim 9, comprising
  detecting change of a flow from a non-heavy status to heavy status and
  based on the change of the flow from a non-heavy to heavy status: providing a marker in the selected queue, assigning a second queue, and permitting processing from the second queue after the marker is detected.

11. The method of claim 9, comprising
  detecting change of a flow from a heavy status to non-heavy status and
  based on the change of the flow from a heavy to non-heavy status: providing a marker in the selected queue, assigning a second queue, and permitting processing from the second queue after the marker is detected.

12. The method of claim 9, comprising:
  determining if a receive rate of packets in the flow meets or exceeds a threshold;
  setting a flow allocation rule to allocate the flow as a non-heavy flow based on the receive rate of the packets in the flow not meeting and not exceeding the threshold over a time interval; and
  setting a flow allocation rule to allocate the flow as a heavy flow based on the receive rate of the packets in the flow meeting or exceeding the threshold over a time interval.

13. The method of claim 9, comprising:
  changing the flow allocation rule to identify the flow as heavy based on a receive rate of the packets in the flow meeting or exceeding a threshold over a time interval and
  changing the flow allocation rule to identify the flow as non-heavy based on a receive rate of the packets in the flow not meeting and not exceeding a threshold over a time interval.

14. The method of claim 9, wherein the hash-based calculation comprises receive side scaling (RSS).

15. The method of claim 9, comprising allocating an application thread that is to access data from packets of the flow for execution on a same core that is to process packets of the flow.

16. The method of claim 9, wherein the flow comprises a Transmission Control Protocol (TCP) connection.

17. A system comprising:
  a computing platform comprising one or more processors and one or more memory devices and
  a network interface communicatively coupled to the computing platform, the network interface comprising:
    a classifier to determine a flow associated with a received packet, wherein the received packet is received from a network;
    a filter configured to apply a rule based on whether the flow of the received packet is considered heavy;
    an allocator to assign the received packet to a queue of a first set of one or more queues allocated to receive one or more packets of a heavy flow if the flow is considered heavy and assign, by receive side scaling (RSS), the received packet to a queue of a second set of one or more queues associated with a non-heavy flow if the flow is considered not heavy, wherein the queue allocated to receive one or more packets of a heavy flow is not part of the second set of one or more queues, the queue allocated to receive one or more packets of a heavy flow is associated with at least one core, and the queue of the second set of one or more queues is associated with at least one core; and
    a direct memory access (DMA) engine to transfer the packet to memory allocated to the assigned queue.

18. The system of claim 17, comprising an application acceleration logic to allocate an application thread that is to access data from packets of the flow for execution on a same core that is to perform packet processing of the flow.

19. The system of claim 17, wherein the assign the received packet to the queue of the first set of one or more queues allocated to receive one or more packets of a heavy flow comprises one or more of: selection an unallocated queue, eviction of a least active heavy flow from a queue, evicting a smaller heavy flow from a queue and selecting that queue, round robin, random, or hash calculation.

20. A non-transitory computer-readable medium comprising instructions stored thereon, that if executed by one or more processors, cause the one or more processors to:
  configure a network interface to:
    assign a packet received by the network interface from a network for processing by at least one core allocated to process packets of an elephant flow if the packet is part of an elephant flow and
    assign a packet received by the network interface for processing by at least one core allocated to process packets of a mouse flow by a hash calculation if the packet is part of a mouse flow, wherein the at least one core allocated to process packets of the mouse flow does not include the at least one core allocated to process packets of the elephant flow.

21. The non-transitory computer-readable medium of claim 20, comprising instructions stored thereon, that if executed by one or more processors, cause the one or more processors to:
configure the network interface to:
detect change of a flow from a non-heavy status to heavy status and based on the change of a flow from a non-heavy to heavy status: provide a marker in the assigned queue, assign a second queue, and permit processing from the second queue after the marker is detected and
detect change of a flow from a heavy status to non-heavy status and based on the change of a flow from a non-heavy to heavy status: provide a marker in the assigned queue, assign a second queue, and permit processing from the second queue after the marker is detected.

22. The non-transitory computer-readable medium of claim 20, comprising instructions stored thereon, that if executed by one or more processors, cause the one or more processors to:
allocate an application thread that is to access data from the flow for execution on a same core that is to perform packet processing on the flow.

23. The network interface of claim 1, comprising:
circuitry to cause a second packet of the flow to be assigned to the one or more queues by RSS based on determination that the flow does not satisfy the rule to identify the flow as a heavy flow.

24. The network interface of claim 1, wherein based on underutilization of the one or more processor cores associated with the second set of one or more queues, the circuitry is to, based on a second packet not being identified as part of the heavy flow, assign the second packet among the one or more queues and the second set of one or more queues by RSS.

25. An apparatus comprising:
a network device interface comprising:
circuitry to categorize a packet of a flow, received from a network, as an elephant flow based at least, in part, on a receive rate of packets of the flow from the network and based on a rule to identify a flow as an elephant flow;
circuitry to, based on the packet not being identified as part of the elephant flow, assign the packet to one or more cores by receive side scaling (RSS); and
circuitry to, based on the packet being identified as part of the elephant flow, assign the packet to a second set of one or more cores, wherein the second set of one or more cores are excluded from allocation using the RSS.

26. The apparatus of claim 25, wherein:
assign the packet to one or more cores by RSS comprises assign the packet to one or more queues associated with the assigned one or more cores and
assign the packet to the second set of one or more cores comprises assign the packet to one or more queues associated with the assigned second set of one or more cores.

* * * * *